March 30, 1965  P. G. R. BOUÉ ETAL  3,175,787
AIRCRAFT HAVING MULTIPLE LIFT ENGINES
Filed July 31, 1963
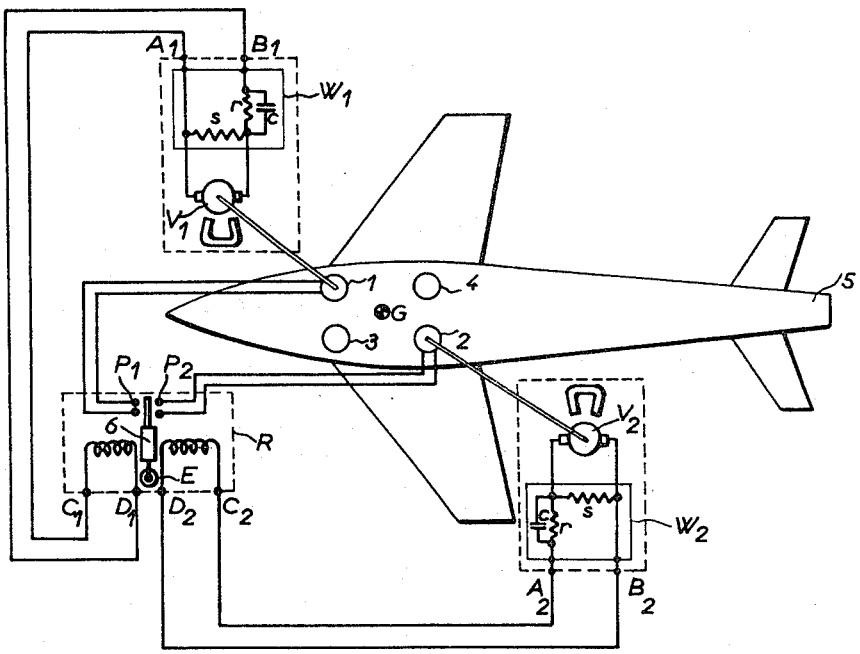
Inventors
Pierre G. R. Boue
Adolphe O. G. Ernst
Jean P. J. Jardinier
By Stevens Davis, Miller & Mosher
Attorneys

United States Patent Office 3,175,787
Patented Mar. 30, 1965

3,175,787
AIRCRAFT HAVING MULTIPLE LIFT ENGINES
Pierre Germain René Boué, Saint-Méry par Champeaux, Adolphe Otton Gontier Ernst, Bois-le-Roi, and Jean Paul Joseph Jardinier, Vitry-sur-Seine, France, assignors to Societe Nationale d'Etude et de Construction de Moteurs d'Aviation, Paris, Seine, France, a company of France
Filed July 31, 1963, Ser. No. 298,999
Claims priority, application France, Aug. 4, 1962, 906,140
5 Claims. (Cl. 244—76)

Aircraft which are equipped with lift turbo-jet engines for the purpose of carrying out vertical manoeuvres, particularly during take-off and landing, may be classified in two groups:

On the one hand, those which have at least one turbojet used both for the propulsion during horizontal flight at high speed and for lift in substantially vertical flight;

On the other hand those which, mainly for reasons of safety, are provided with a plurality of lift turbo-jets. With aircraft of this class, accidental failure of one turbojet involves only a reduction, and not the complete failure, of the lifting thrust.

It is an object of the present invention to increase still further the safety of this second type of machine. In practice, jets which serve solely for lift generally only have two operating speeds, namely the idling speed and the rated thrust speed. It follows that any reduction in the speed of an engine leads to its idling and immediately causes not only a reduction in the resultant of the thrusts of the lift jets, as stated above, but also substantial displacement or off-setting of said resultant thrust, which thus no longer passes through the centre of gravity of the machine. The moment which thus arises, tending to upset the machine, may exceed the stabilizing moment of the machine and cause a sudden change of trim, reducing still further the vertical lifting component of the resultant of the thrusts of the remaining lift jets.

It is a further object of the invention to provide, in an aircraft comprising a plurality of lift engines, means which, in the event of failure of one of said engines, reduce the lifting thrust of at least one other engine which, in relation to the centre of gravity of the aircraft, is situated at the opposite side thereof, in such a manner as to reduce or cancel out the unbalance in the moments applied to the aircraft. This will be achieved at the cost of an additional reduction in the total lifting thrust and such means will preferably be applied only in the case where the resultant lifting thrust, which remains with two engines stopped, is still sufficient to support the weight of the aircraft. If this remaining thrust is less than the weight of the aircraft, the latter will crash, but without any sudden change in trim, so that the pilot can still actuate an ejector seat under favourable conditions for survival.

In its simplest practical application, the means provided by the invention is effective, when a first engine has failed, to bring a second engine, which is precisely symmetrical with the first in relation to the centre of gravity of the aircraft, into the same operating condition as the first, this condition generally being the idling or stopped condition.

Nevertheless, it goes without saying that the invention also covers devices for restoring the balance of the moments of any lift engines at the cost of a reduction in the total thrust, which is still supplementary but the value of which is less than the thrust of a failed element or engine, such restoration being effected by control of the operation of at least one element or engine, which is further away from the centre of gravity of the aircraft than the element or engine which has failed.

Various devices are capable of providing the sequence of detecting and control steps constituting the operation which has just been described. The invention also provides a detecting device which has the advantage of simplicity and which may be combined with any device for controlling the thrust of each elemental turbo-jet.

According to a preferred feature of the invention, each lift turbo-jet engine includes a rotor and an electric tachogenerator which enables the speed of rotation of said rotor to be known at any moment. The generators associated with two symmetrical turbo-jets are respectively connected to oppositely wound windings, which cooperate with a movable blade to constitute a polarized relay. This relay influences, by completing an electric circuit for example, one of the two control devices respectively incorporated in said symmetrical turbo-jets, in such a manner that the windings on the blade of the relay leads to a reduction in the running speed of that turbo-jet which is symmetrical with the one which has failed.

It goes without saying that, without departing from the scope of the invention, it is possible to replace a two-step control device applied to the grouping in pairs of strictly symmetrical elements or engines, by progressive control and the grouping of more than two elements or engines, thus enabling the condition of equilibrium of the moments to be assured with, in general, less reduction in the total resultant thrust.

It is particularly advantageous to detect not only the speeds of rotation of the rotors but also the angular accelerations in such a manner as to compensate for the delay constant of the assembly comprising the turbo-jet and the tachometric detection device. The provision, in the circuit comprising the tacho-generator and one winding of the relay, of a correction circuit, adapted to determine a phase lead in the signal emitted in case of failure, so as to reduce the response time, is a simple means of obtaining this effect. Such a correction circuit may, however, be replaced by an angular accelerometer driven mechanically by each turbo-jet.

The following description with reference to the accompanying drawing, given by way of non-limitative example only, will enable the various features of the invention to be more fully understood.

In the drawing, the single figure is a diagram of an electrical detection device according to the invention, showing also the arrangement of the associated turbo-jets.

Referring to the drawing, a vertical take-off jet aircraft 5 will be seen, having a set of turbo-jets arranged in the vicinity of its centre of gravity G. By way of example, four such lift turbo-jets are shown; they are arranged in pairs, jets 1, 2 and 3, 4 respectively, being symmetrical in relation to the centre of gravity G.

Each turbo-jet drives an electrical tacho-generator V, which may be a dynamo or tacho-alternator, for instance. Associated with each tacho-generator is a second electric generator W, connected, for example, in series with the first and responsive to the angular acceleration of the rotor of the turbo-jet. The generators associated with the turbo-jet bearing reference numeral 2, for example, have references $V_2$ and $W_2$, thus bearing the corresponding index, as also do the terminals $A_2$ and $B_2$ of the detection device as a whole.

The electric generator W may be a correcting circuit adapted to determine a phase lead, intended to compensate for the time constant of the assembly constituted by a turbo-jet and its associated tachometric detection device. This circuit comprises (see drawing) two resistors $r$ and $s$ connected respectively in series and in shunt, the series resistor $r$ being shunted by a capacitor $c$. Such compensating networks are in current use in the art of servomechanisms and the operation thereof will not be described in detail. Mention will merely be made of the fact that the ratio of the output voltage of such a network to its input voltage, if the latter is constant, is equal to the quotient $s/(r+s)$ in which the letters represent the ohmic values of the resistors. When the input voltage varies between one level and another, a transient appears. The capacitor $c$ ceases to behave like an infinite impedance and shunts the resistor $r$ in such a manner that the output voltage is momentarily different from the value which it had in the stabilized state, given by the quotient above, and which differs all the more, the more rapidly the input voltage varies.

A relay R is provided, having two opposed windings $C_1D_1$ and $C_2D_2$ connected, respectively, to the devices for detecting the speed of rotation and the acceleration of the rotors of two of the turbo-jets, the turbo-jets 1 and 2 for example. The relay R includes a contact blade 6 pivoting about an axis E and having a central neutral position. The blade 6 has associated with it, two pairs of contact studs $P_1$ and $P_2$ connected respectively in the circuits controlling the thrust of the turbo-jets 1 and 2.

Any unbalance in the thrust of these turbo-jets, following the accidental reduction in the speed of one of them, say the turbo-jet 1 for example, and involving a reduction in the corresponding thrust and a sudden moment tending to unbalance the aircraft, simultaneously causes the production of an electric signal in the tachometric and accelerometric detection devices $V_1$ and $W_1$. This signal leads to a corresponding reduction in the electro-magnetic attractive force of the winding $C_1D_1$ on the blade 6. This pivots and causes the closing, at $P_2$ of a circuit which acts, for example by means of an electro-magnet or an electric motor driving a rack, on the thrust control of the turbo-jet 2 in the direction to reduce the speed thereof (so as to slow it down to, for example, idling speed or even to stop it). The tachometric device $V_1,V_2$ reacts only to differences in speed between a pair of engines, but the presence of the compensating networks $W_1$ and $W_2$ increases the sensitivity and reduces the response time, which is particularly important in the event of violent drops in speed.

It goes without saying that devices based on the same principal but controlling more than two turbo-jets may easily be constructed. The windings CD and the contacts P of a differential relay may actually be increased in number in order to effect the balancing of the moments of more than two turbo-jets which are not precisely symmetrical, and this may be done in a gradual manner instead of by a two-step action. For this purpose, the contacts P may be replaced by a potentiometer and the blade 6 may be equipped with springs for restoring it to its neutral position. A compensating network detecting angular accelerations could also be replaced by an angular accelerometer driven mechanically by the rotor, like the tacho-generator.

Needless to say, the invention likewise extends to the modification, with the scope of the appended claims, of the device described above, by the substitution of equivalent technical means which, nevertheless, permit the construction of a safety device based on the principle of balancing the elemental thrusts described above.

What is claimed is:

1. In an aircraft having a plurality of lift engines or groups of lift engines arranged on each side of its centre of gravity in such a manner as to generate normally, by their operation, thrusts whose moments are balanced in relation to the centre of gravity and having means to control said thrusts, a safety device comprising, in combination, detection means associated with each engine and delivering a signal which is a function of the thrust of said engine and comparison means associated with at least two engines, the moments of whose thrusts are balanced in relation to the centre of gravity of the aircraft, the comparison means being adapted to receive signals from the detection means associated with said two engines and being connected to the thrust control means, so as to ensure simultaneous reduction in the thrust of the said two engines whose moments are balanced in relation to the centre of gravity of the aircraft, if either one of said two engines should fail.

2. In an aircraft having a plurality of turbo-jet engines or groups of turbo-jet engines arranged on each side of its centre of gravity in such a manner as to generate normally, by their operation, thrusts whose moments are balanced in relation to the centre of gravity and having means to control said thrusts, a safety device comprising, in combination, an electric tacho-generator driven by each engine and a relay having windings respectively connected to said tacho-generators and a blade which is movable under the electromagnetic action of said windings, said relay being connected to the thrust control means in such a manner as to ensure a simultaneous reduction in the thrust of the turbo-jet engines whose moments are balanced in relation to the centre of gravity of the aircraft, if one of said engines should fail.

3. A safety device as claimed in claim 2, further comprising an accelerometric detector connected in series with each tacho-generator, to deliver an electric signal which is a function of instantaneous variations in the thrust of the turbo-jet engine which drives the corresponding tacho-generator.

4. A safety device as claimed in claim 2, wherein the turbo-jet engines are arranged in pairs symmetrically in relation to the centre of gravity of the aircraft, one relay being associated with each two symmetrical turbo-jet engines.

5. A safety device as claimed in claim 3, wherein the accelerometric generator is a differentiation circuit or quadripole.

References Cited by the Examiner
UNITED STATES PATENTS

| | | |
|---|---|---|
| 2,670,157 | 2/54 | Peterson. |
| 2,774,558 | 12/56 | Alderson. |
| 2,842,108 | 7/58 | Sanders. |
| 3,022,628 | 2/62 | Prentiss _____ 60—35.6 |

MILTON BUCHLER, *Primary Examiner.*

FERGUS S. MIDDLETON, *Examiner.*